(12) United States Patent
Nixon et al.

(10) Patent No.: US 6,513,060 B1
(45) Date of Patent: Jan. 28, 2003

(54) SYSTEM AND METHOD FOR MONITORING INFORMATIONAL RESOURCES

(75) Inventors: Miles J. Nixon, Cincinnati, OH (US); Alan R. Moyer, Hamilton, OH (US); Christopher A. Moyer, Hamilton, OH (US)

(73) Assignee: InternetSeer.com Corp., Thorton, PA (US)

( * ) Notice: Subject to any disclaimer, the term of this patent is extended or adjusted under 35 U.S.C. 154(b) by 0 days.

(21) Appl. No.: 09/141,245

(22) Filed: Aug. 27, 1998

(51) Int. Cl.[7] ............................................. G06F 15/16
(52) U.S. Cl. ...................................... 709/203
(58) Field of Search ............................. 709/224, 223, 709/100, 203, 227, 226, 225, 217–219; 707/9, 10, 201; 713/202

(56) References Cited

U.S. PATENT DOCUMENTS

| | | |
|---|---|---|
| 5,506,955 A | 4/1996 | Chen et al. |
| 5,553,235 A | 9/1996 | Chen et al. |
| 5,600,632 A | 2/1997 | Schulman |
| 5,613,096 A | 3/1997 | Danknick |
| 5,640,513 A | 6/1997 | Dauerer et al. |
| 5,684,945 A | 11/1997 | Chen et al. |
| 5,717,861 A | 2/1998 | Rabii |
| 5,727,159 A | 3/1998 | Kikinis |
| 5,751,961 A | 5/1998 | Smyk |
| 5,751,966 A | 5/1998 | Dauerer et al. |

OTHER PUBLICATIONS

Red Alert Internet Web Site; downloaded Jun. 30, 1998; www.redalert.com.

Primary Examiner—Mark H. Rinehart
Assistant Examiner—Hien Le
(74) Attorney, Agent, or Firm—Victor Moreno

(57) ABSTRACT

A system and method are provided to monitor informational resources, such as websites. A plurality of host units support one or more informational resources accessible over a network, such as the Internet. A plurality of monitoring units located on a distributed computer system are coordinated to access the network and monitor the informational resources to determine if they are accessible and to evaluate their performance. Preferably, a central control unit manages the monitoring units.

7 Claims, 4 Drawing Sheets

SYSTEM AND METHOD FOR MONITORING INFORMATIONAL RESOURCES

TECHNICAL FIELD

The present invention relates generally to computers and software, and more specifically to a method and apparatus for monitoring informational resources, such as webpsites on the Internet or intranets.

BACKGROUND

The virtual explosion of technical advances in microelectronics, digital computers and software have changed the face of modern society. In fact, these technological advances have become so important and pervasive that this explosion is sometimes referred to as "the information revolution." Through telephone lines, cables, satellite communications and the like, information and resources are ever increasingly being accessed and shared.

Informational resources, which are typically interactive in nature, are a commonly used vehicle to share information and resources. Informational resources can take a variety of forms, including but not limited to HTML (hypertext mark-up language), XML (extended mark-up language), Java or ActiveX applets, still or moving graphics, audio, ASCII, text, and the like. For instance, informational resources are often provided on the Internet as websites, on an intranet as a page or document, on an e-mail system as a mail request, and the like. Whatever the particular form of the informational resource, a computer or group of computers are programmed to support the informational resources.

SUMMARY OF THE INVENTION

An object of the invention is to provide a system and method for monitoring informational resources. Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the invention is a method for use in conjunction with a distributed computer system. A plurality of host units access a network comprising a plurality of interconnected computers capable of sending and receiving data to and from one another. Each host unit supports one or more informational resources accessible through the network. A plurality of monitoring units, each located on a different computer in the distributed directory, are coordinated and access the network. The performance (e.g. accessability) of at least one informational resource is monitored by at least one monitoring unit.

Another aspect of the present invention is a computer system for use in conjunction with the Internet. A plurality of host computers each have access to the Internet and support a website on the Internet. A plurality of monitoring computers each have access to the Internet. Each of the monitoring computers is operative to transmit messages to and receive messages from one or more of host computers through the Internet and to monitor the accessability and performance of the corresponding host computers and supported websites. A managing computer has access to the monitoring computers. The managing computer is operative to transmit messages to and receive messages from the monitoring computers and to manage the monitoring computers.

Yet another aspect of the present invention is a method for monitoring an informational resource being supported by a host computer. The method comprises the steps of:

a) determining whether the host computer is pingable;

b) if the host computer is pingable, performing a ping operation comprising the steps of:
   (i) sending a ping to the host computer;
   (ii) determining whether the host computer responds to the ping;
   (iii) if the host computer does not respond to the ping, sending a message;

c) attempting to access the informational resource; and d) if the informational resource is not accessible, sending a message.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Some aspects of the invention will be illustrated in the context of the Internet and websites. However, one with ordinary skill in the art will readily recognize that the invention has utility in the context of any network, including but not limited to intranets, and in connection with any informational resource. The Internet began in the late 1960s as an experimental project to link together Defense Department computers has blossomed into a globally interconnected virtual community often referred to as Cyberspace. The Internet comprises more than 30,000 interconnected computer networks located in over 70 countries. The World Wide Web (or Web) was created by researchers in Switzerland and comprises a set of interlinked information resources, typically in the form of HTML-based files. These files, often called websites, web pages, or web documents are located throughout the world on and supported by computers (or servers) that are connected to the Internet.

Figure 1:
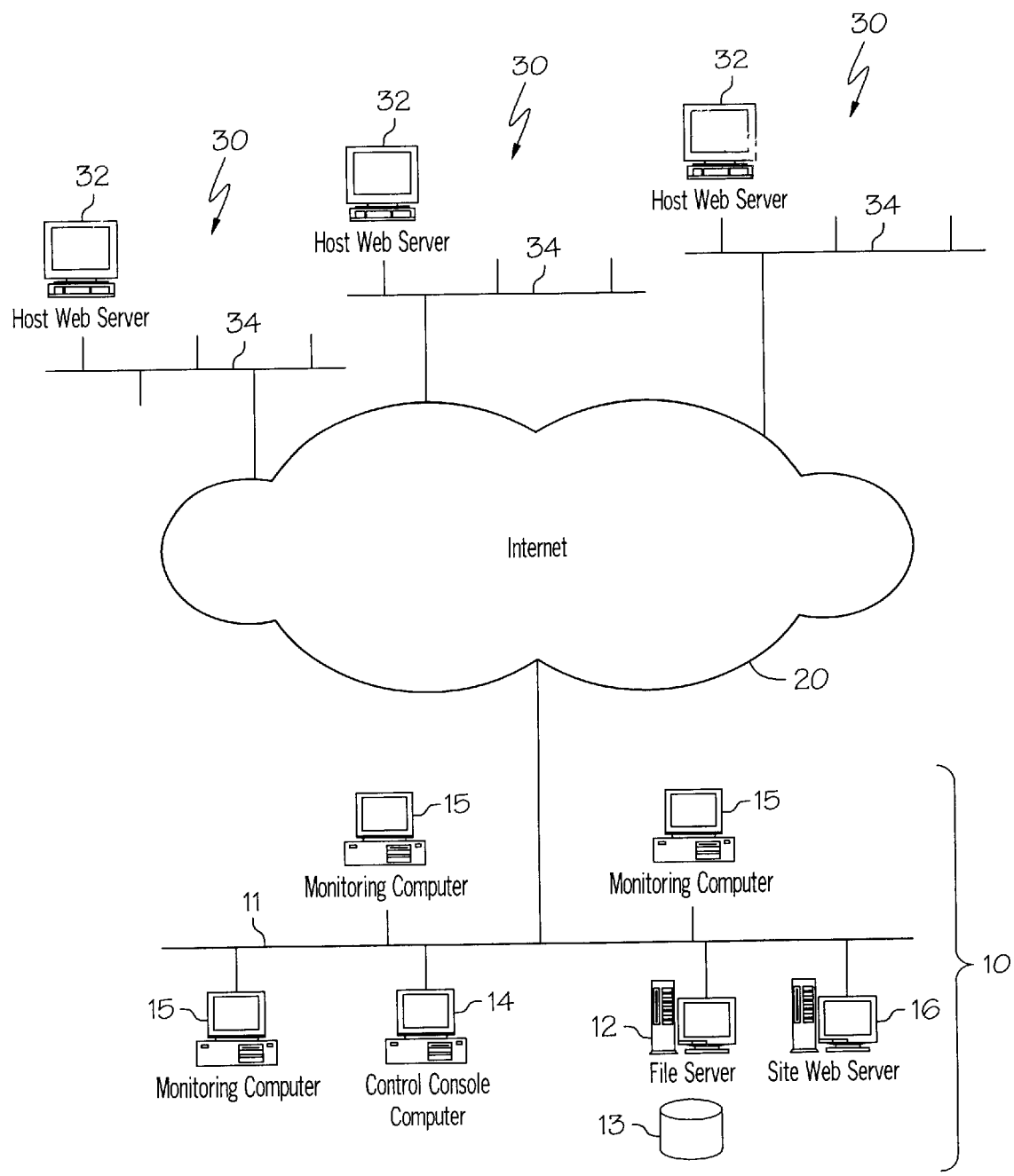
FIG. 1 illustrates a computer system for monitoring informational resources.

One aspect of the present invention is illustrated in FIG. 1. The domestic network 10 is connected to the Internet 20. The foreign networks 30 each have a host web server 32 connected to the Internet 20 over the connection 34. The domestic network 10 provides a monitoring system that will determine whether host web servers 32 have stopped functioning and do not respond to requests to provide their website data. Two elements of the monitoring system include a control console computer 14 and the monitoring computers 15. The control console 14 transmits messages to and receives messages from the monitoring computers 15 to manage and coordinate the monitoring computers 15. The monitoring computers 15 transmit messages to and receive messages from one or more host web servers 32 over the Internet 20. The monitoring computers 15 also monitor and determine the performance of the corresponding host web server 32. The monitoring system is scalable, in that the entire system may run in its entirety on a single computer, or various components may be distributed on a number of computers. For instance, monitoring capacity can be increased by installing additional monitoring computers 15. The additional monitoring computers 15 automatically synchronize with a control console 14 and will be instructed which host web servers 32 to monitor. Also depicted in the domestic network 10 is an optional web server 16 which maintains and supports a domestic website. Information in the network 10 can be accessed remotely over the Internet 20 via the web server 16.

Various data tables containing monitoring information and report files resulting from the monitoring are stored on a file server 12 on an attached computer readable medium 13, shown here as a hard disk. A computer readable medium generally refers to anything which holds information readable by a computer, such as programs, data, files, etc. As one with ordinary skill in the art will readily appreciate, computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", flash memory, etc.), and the like. Certain types of computer readable media, which are sometimes described as being nonvolatile, can retain data in the absence of power so that the information is available when power is restored.

The control console 14 builds a table and schedule of host web servers 32 to be monitored from a web host database stored on the file server 12. The web host database is used by the control console 14 to determine which host web servers 32 are to be tested and when. When the predetermined time to check a host web server 32 is reached, the control console 14 contacts a monitoring computer 15 and instructs it to check the host web server. In its instructions to the monitoring computer 15, the control console 14 includes information such as "pingable", timing information, when it expects to hear back from the monitoring computer 15, and the like. In its schedule table, the control console 14 marks the host web server 32 as being in an active monitoring state.

The monitoring system will proactively monitor host web servers 32 and send alarm messages when predetermined conditions exist, preferably immediately after the condition has been detected. One example of such a condition is if a host web server 32 is down (does not respond to pings, if it is a pingable system). Another example is if a host web server software will not return its website data. Still another example is if predetermined response time performance parameters are exceeded. Beyond the above examples, other predetermined conditions could also trigger an alarm. Alarm messages are preferably directed to the host web server 32 owner and may take a variety of forms, including a pager alarm, e-mail, fax, voice phone, and the like.

Figure 2:
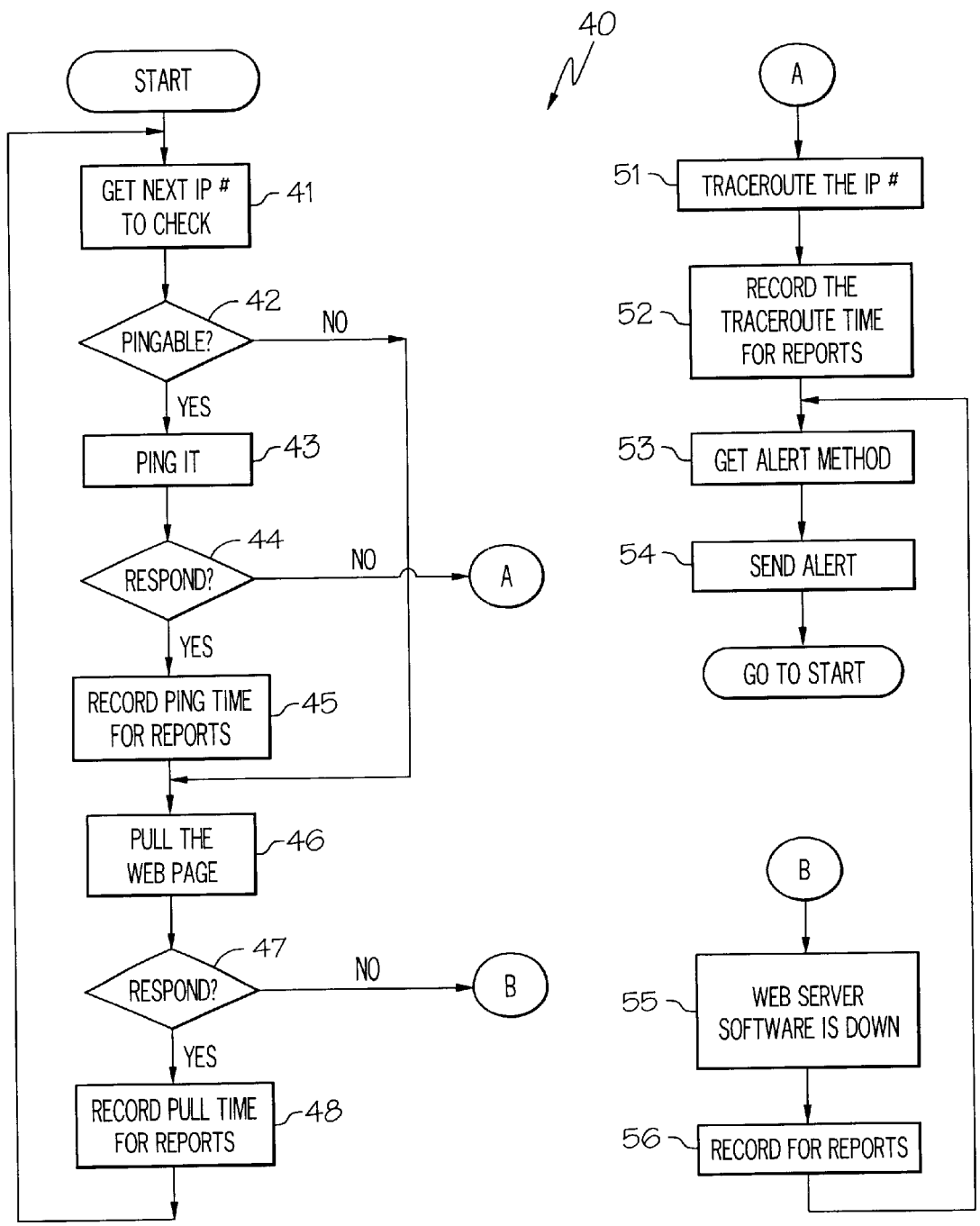
FIG. 2 illustrates a flowchart of a method for monitoring informational resources.

FIG. 2 depicts one example of a method 40 for monitoring the performance of a website supported by a host web server. At step 41, a loop is started to check a list of one or more host web servers. For each host web server on the list, the IP address for the corresponding host web server is determined. At step 42, the method determines whether the host web server is "pingable." For instance, to "ping" a TCP/IP computer is a standard method of determining whether a computer is active, and communicating via TCP/IP, regardless of whether host web server software is active on it. Some TCP/IP computers have this feature intentionally disabled for various reasons, including some security issues, so it cannot be assumed that all host web servers are "pingable". One way of making a "pingable" determination is to reference the web host database which contains information about host web servers, such as whether the host web server is "pingable" or not.

If the host web server is pingable, the method proceeds to step 43 where a ping is sent over the Internet, preferably from a monitoring computer. At step 44, if the host web server responds, the response time is sent to the control console, which stores the information in a report database on the file server 12. If the host web server is pingable, but does not respond to pings, at step 51 the monitoring computer performs a "trace route" operation to record if there is a break in the Internet as packets trace their way to the host web server. In step 52, the trace route information, such as the trace route time, is sent to the control console, which stores it in the report database on the file server 12 for later analysis.

At step 53, the method for sending an alert message is determined. For instance, the party responsible for operating the host web server can select a method to be contacted if the host web server is considered unavailable, which is stored in a database on the file server. Some preferred methods of contact include pager, e-mail, fax, voice phone, or the like. If a monitoring computer has determined that a host web server in the active monitoring state is unavailable, the monitoring computer reads the database to determine which method of contact the party responsible for operating the host web server has selected, and then contacts them accordingly in step 54.

After sending the initial alert message, the monitoring computer keeps this host web server in an active monitoring state and periodically starts this process over. This active monitoring state is continued until the host web server is either returned to service and responds to monitoring, or the party responsible for operating the host web server requests that monitoring and alerts be temporarily halted.

If the host web server responds to a ping or if the host web server is not pingable, the method proceeds to step 46 where the web page is attempted to be accessed. The monitoring computer sends a request to the host web server to return its primary web page. At decision block 47, the monitoring computer determines whether the host web server responds. If the host web server returns its primary web page within a predetermined time period, it is considered available. At step 48 the monitoring computer records the time that the host web server was contacted and the response time to return the primary web page in the report database for the host web server and sends this information to the control console. The control console then stores it in the report database on the file server.

In step 48 the host web server can additionally transmit other data to the monitoring computer. For instance, a client agent can be embedded in the web page. Whenever a host web server returns its website to a requesting web browser, it executes the client agent which stores usage and other statistical information. The control console computer processes this information and stores it in the report database on the file server. This information is used to in generating usage reports of the host web server.

If the host web server does not return its primary web page within the predetermined time period, it is considered unavailable and the monitoring computer proceeds to step 55 where the host web server software is determined to be down. The transactional information is stored in step 56, and the method continues to step 53.

Figure 3:
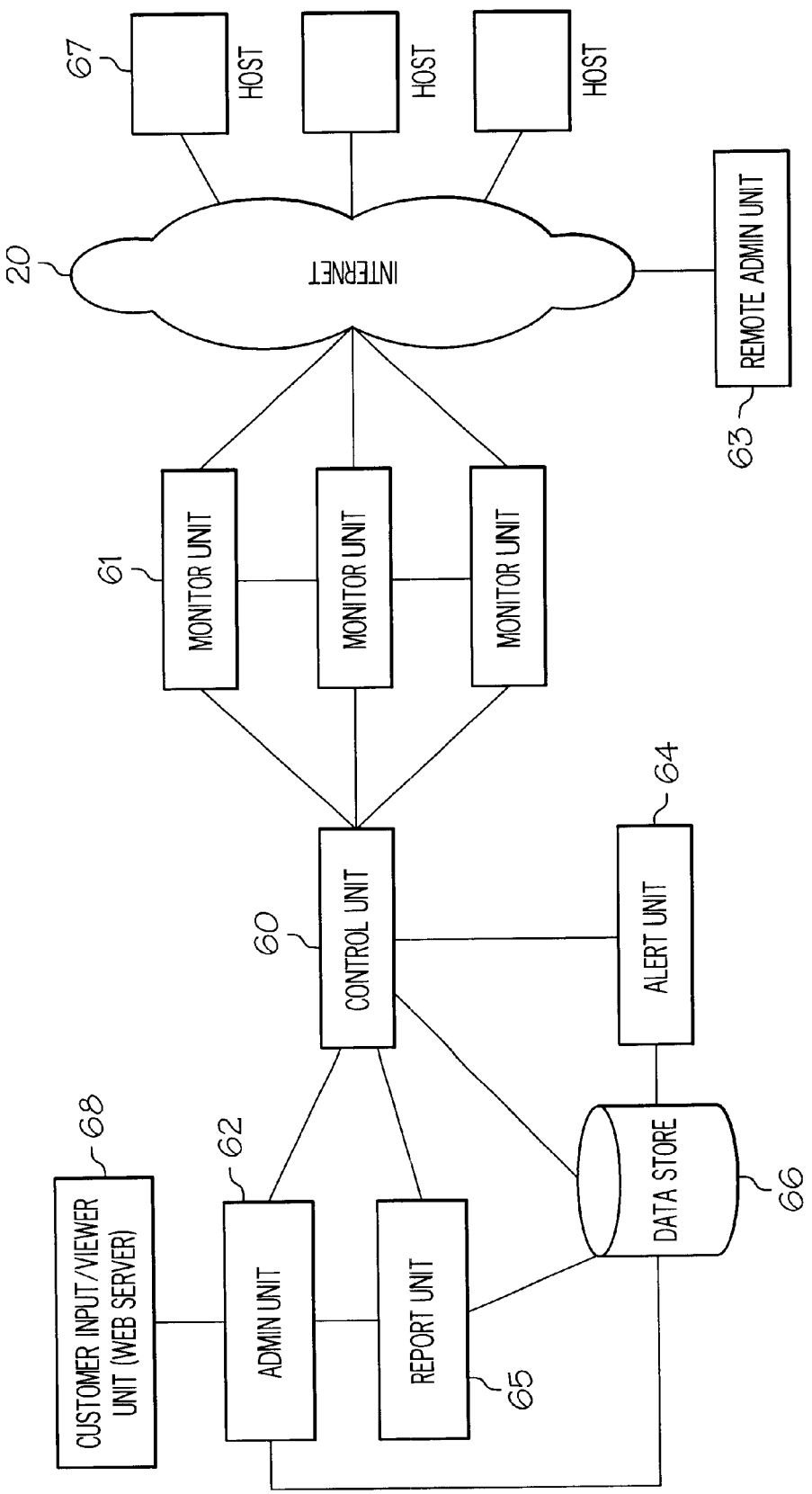
FIG. 3 illustrates the interrelationship between various software components for monitoring informational resources.

FIG. 3 depicts the interrelationship between various software components or units, which refer to a group of instructions, preferably located on a computer readable medium, that work in conjunction to achieve a desired result or perform one or more functions. The various units can be run from a single computer or as a distributed system on separate computers which communicate over a network, preferably a LAN, to act as a complete system. One advantage of operating as a distributed system is that the number of informational resources can be dramatically increased compared to a system operating on a single computer. The distributed system is fully scalable, so computers can freely be added or removed with minimal or no configuration modifications.

In one embodiment of a distributed system, the control unit 60 acts like a central manager and links most aspects of the monitoring system. Some of the control unit's 60 functions include, but are not limited to:

Reading and configuring the other units;

Scheduling and dispatching monitoring activities to the monitoring units 61;

Monitoring the activity of the monitoring units 61;

Scheduling and dispatching alerts to the alert unit 64;

Storing monitoring and performance data on the data store 66; and

Communicating status and performance data to the report unit 65.

Preferably, the control unit 60 is programmed in an object oriented environment. In such an environment, some of the software components of the control unit 60 include a Configuration object, a Scheduler object, and a Dispatcher object. However, one with ordinary skill in the art will recognize that the software components could be programmed using other development environments. Preferably, the control unit 60 is loaded and run on a server on a network.

The monitor units 61 communicate and monitor via a network (e.g. the Internet 20) with the host units or hosts 67. The host units 67 support and maintain one or more informational resource accessible over a network. The host units are preferably run on any pingable computer, including but not limited to Unix hosts, web servers, DNS servers, mail servers, FTP servers, news servers, and the like. The monitor units 61 have enough intelligence to conduct all monitoring of one or more host units 67. For instance, in the case of website informational resources, the host units 67 and the computers on which the host units 67 are run are monitored by the monitor units 61, including:

Pinging the web server;

Performing a trace route on web servers;

Accessing the website;

Monitoring the web server;

Monitoring web server performance;

Checking website for changes (checksum);

Hacking check (literal string check); and

Website link check.

Some of the software components of the each monitor unit 61 include a ServerConnection object and one or more MonitorTask objects. Preferably, the monitor units are loaded and run on client machines on a network.

The administrator unit or admin unit 62 provides administrative features. The admin unit 62 has three basic operating modes. Operator mode is a default mode when the admin unit 62 is first run. This is a protected mode for monitoring site operators. Access to lower level configuration data is not provided at this level. In the administration mode, a password must first be entered and validated. This protected mode provides access to all levels of configuration data. The admin unit 62 operates in the remote administration mode when the admin unit 62 detects that it is not running on the same network as the rest of the system units. The admin unit 62 it assumes that it is running from a remote location, such as over the Internet as indicated by reference 63. A remote access password is then required, in which case the user has rights equivalent to operator mode or administration mode, depending on the level of rights accorded the entered password. The admin unit 62 includes the following functions:

Provides a user interface for configuration files;

Displays reports and graphs of real-time status and performance;

Monitors configuration files for new or changed input from operators or customers, including input from host units 67, and notify other units that changes have occurred; and Monitors a domestic web server for real-time report requests.

Some of the software components of the admin unit 62 include a Communications object (includes remote admin relay), a ReportDisplay object, and a MonitorConfig object.

The alert unit 64 creates and publishes alert messages, preferably in response to a request from the control unit 60. Some of the alert unit 64 functions include:

Generate numeric paging alert;

Generate e-mail alert;

Generate fax alert;

Generate voice phone alert, or send alert to operator to call an individual; and Escalate alerts after a predetermined number of alerts.

Information as to the type of alert message and the contents of the alert message are read from the data store 66 or provided to the alert unit 64 from the control unit 60. The major components of the alert unit 64 include a Communications object, a PagerAlert object, a EmailAlert object, a FaxAlert object, a VoiceAlert object, and an Escalation object. Preferably,, the alert unit 64 is loaded and ran on a server in a network. Such as the same servers that the control unit 60 is loaded.

The report unit 65 generates and provides reporting features. Some of the functions of the report unit 65 include:

Scheduling report generation;

Generating reports and graphs for output to web server pages;

Generating reports and graphs for output to e-mail;

Generating reports and graphs for output to fax; and

Taking special report requests from other units and generates them.

The major components of the report unit 65 include a Communications object, a ReportScheduler object, a GenerateReport object, a WebPageOutput object, a EmailOutput object, and a FaxOutput object. Preferably, the report unit 65 is loaded and ran on a server in a network, such as the same server that the control unit 60 is loaded.

One example of a report is a performance report comprising both text and graphs. The report unit 65 retrieves data from the data store 66 and processes the data for presentation in the performance report. Some examples of the information contained in a performance report, including but not limited to:

Minimum, average, and maximum ping time to the computer on which the host unit 67 is running;

Dates and times that the host unit 67 was unavailable;

Minimum, average, and maximum time to retrieve the informational resource supported by the host unit 67;

Dates and times that the host unit 67 would not return its informational resource;

Number of hits (accesses) to the informational resource; and

Number of hits compared to one or more of the other informational resources being monitored by the system.

Performance reports are generated periodically upon the instruction of the control unit 60, unless a critical condition exists. Alternatively, a performance report can be generated upon a user's command through via the admin unit 62.

The customer input/viewer unit or customer unit 68 provides a user interface to interact with the monitoring system. Preferably, the customer unit is a protected server side program running on a domestic web server. The customer unit interfaces with the remaining units through the admin unit 62. Some of the functionality of the customer unit include allowing a user to:

Purchase monitoring services;

Add or remove host units to monitor;,

Pause or restart monitoring; and

View reports.

The major components of the customer unit 68 include a Communications object, a AddRemoveHost object, a PauseRestart object, and a ViewReport object.

Various configuration and data files are created and accessed by the monitoring system. For the purpose of managing a group of distributed computers which are working together to monitor hosts, the group will be called a Monitor Set. Ideally, a Monitor Set will have a directory set up in a centrally located position, such as the data store 66 on a centrally located file server, and contain all configuration and data files to be used. The following example illustrates a basic directory configuration:

S:\Monitor
   Class
     Java class code
   MSA
     Configuration and data files
     Cust_1
       Customer data files
     Cust_2
       Customer data files
     Cust_x
       Customer data files
     OPERATIONS In this example, the directory S:\Monitor\MSA refers to Monitor Set A. Within this directory are the following configuration and data files:

| | |
|---|---|
| UNIT-IP.DAT | Unit IP number master file. |
| CU.DAT | CU (Control Unit 60) configuration file. |
| MU.DAT | Common MU (Monitor Unit 60) data file. |
| MU-xxx.xxx.xxx.xxx.DAT | Unique MU data file. |
| LU.DAT | LU (aLert Unit 64) configuration file. |
| RU.DAT | RU (Report Unit 65) configuration file. |
| AU.DAT | AU (Admin Unit 62) configuration file. |
| CIVU.DAT | CIVU (Customer Input/Viewer Unit 68) configuration file. |
| DS.DAT | DS (Data Store 66) configuration file. |
| CUSTID.DAT | Customer ID master file. |

Under the MSA directory is one subdirectory for each customer to contain their files. The subdirectory is named by the customer id number, which is contained in the CUSTID.DAT file. For instance:

| | |
|---|---|
| .\CID_00000001 | Subdirectory for customer number 1 |

Within the customer directory are the following files:

| | |
|---|---|
| CUSTOMER.DAT | General customer data |
| xxx.xxx.xxx.xxx.HOST | Customer host configuration file. One per host. |
| xxx.xxx.xxx.xxx.ABYPASS | File to indicate temporary alert bypass. |
| xxx.xxx.xxx.xxx.MDATA | Customer host monitoring results data file. |
| xxx.xxx.xxx.xxx.ALERT | Customer host alert record data file. |

Also under the MSA directory is one subdirectory for business operation files. The subdirectory is named OPERATIONS. One OPERATIONS subdirectory exists for each Monitor Set.

| | |
|---|---|
| .\OPERATIONS | Subdirectory for operation data |

Within this directory are the following files:

| | |
|---|---|
| OPERATIONS.DAT | General operations data |
| OPERATIONS.RESPONSE | Operations configuration file. |
| OPERATIONS.ABYPASS | File to indicate temporary alert bypass. |
| OPERATIONS.MDATA | Operations results data file. |
| OPERATIONS.ALERT | Operations alert record data file. |

In one embodiment, each unit has two possible configuration data files. For all units of a type (e.g. a monitor unit 61) there is a common configuration data file. Optionally, there may be additional unique configuration data files for individual units, having data that is unique for that particular unit. The common configuration data file is read first. Then, if it exists, the unique configuration data file is read and overwrites any values from the common configuration data file. The unique configuration data files contain the same type data as the common configuration data files, but may only contain data that changes, not the entire group of data.

The following is an example of how dual configuration files would be implemented for a hypothetical monitor unit 16. The common configuration data file could be configured:

[cu_ip_number]xxx.xxx.xxx.xxx
[num_simul_hosts]xx
[num_ping_pkts]x

[ping_pkt_len]xx
[ping_timeout_ms]xxx
[ping_interval_ms]xxx

The unique configuration data file for a given monitor unit 16 having a unique identifier of MU "_"xxx.xxx.xxx.xxx could be formatted as follows:

[ping_pkt_len]xx
[ping_timeout_ms]xxx

Note that in this example, only two items would be overwritten from the unique configuration file. Also note that in each configuration data file, each line item is prefaced with an id tag. This is so the unique configuration data files only need to contain the information that changes.

Examples of the configuration and data files follow. In the following configuration data file examples, if the IP number for any of the individual units is ZERO, that indicates the unit is running on the same computer (internal unit) and there is no communication over the network to that unit.

The MSA directory includes a common units configuration data file (UNIT-IP.DAT). All unit IP numbers, except for monitoring units 61, are defined here. When a unit starts up, it checks this file for the other unit IP numbers. If the IP number of the other units are the same as its IP number, then it is running on the same computer. If the IP number of the other units are different, then it is running on a different computer and in a distributed mode. The following illustrates the format of UNIT-IP.DAT:

/* UNIT-IP.DAT—Common Units Configuration Data File
   Created: mm/dd/yyyy
   Modified: mm/dd/yyyy
*/
[cu_ip_number]xxx.xxx.xxx.xxx
[lu_ip_number]xxx.xxx.xxx.xxx
[ru_ip_number]xxx.xxx.xxx.xxx
[au_ip_number]xxx.xxx.xxx.xxx
[civu_ip_number]xxx.xxx.xxx.xxx
[ds_ip_number]xxx.xxx.xxx.xxx
/*eof*/

The MSA directory contains control unit 60 configuration data file (CU.DAT). When the control unit 60 starts up, it checks UNIT-IP.DAT for the IP numbers of the other units. Then it checks this file for operating parameters. It knows nothing about any monitoring unit 61 until the monitoring unit 61 contacts the control unit 60 to be registered. The following illustrates the format of CU.DAT:

```
/* CU.DAT
   Common Control Unit Configuration Data File
   Created: mm/dd/yyyy
   Modified: mm/dd/yyyy
*/
[mu_status_retries] x          // max count
[mu_reset_timeout] x           // seconds
[mu_timeout_action] aaaaaa     // coded action to take: send alert, etc.
[mu_max_bad_chksums] x         // max count
[lu_status_retries] x          // max count
[lu_reset_timeout] x           // seconds
[lu_timeout_action] aaaaaa     // coded action to take
[au_status_retries] x          // max count
[au_reset_timeout] x           // seconds
[au_timeout_action] aaaaaa     // coded action to take
[ru_status_retries] x          // max count
[ru_reset_timeout] x           // seconds
[ru_timeout_action] aaaaaa     // coded action
[ds_status_retries] x          // max count
[ds_reset_timeout] x           // seconds
[ds_timeout_action] aaaaaa     // coded action to take
[scan_freq] 4,10,60            // scan frequencies
/*eof*/
```

The MSA directory contains a monitoring unit 61 configuration data files. When a monitoring unit 61 starts up, it checks UNIT-IP.DAT for the IP number of the control unit 60 and then registers itself to accept work. The monitoring unit 61 gets all other information about itself from the control unit 60. The following illustrates the format of the common configuration data file (MU.DAT) and the unique configuration data file:

```
/* MU.DAT
   Common Monitor Unit Configuration Data File
   Created: mm/dd/yyyy
   Modified: mm/dd/yyyy
*/
[num_simul_hosts] xx
[num_ping_pkts] x         // count
[ping_pkt_len] xxx        // bytes
[ping_timeout_ms] xxx     // milliseconds
[ping_interval_ms] xxx    // milliseconds
[max_idle_time_s] xx      // seconds
/*eof*/
```

```
/* MU-xxx.xxx.xxx.xxx.DAT
   Unique Monitor Unit Configuration Data File
   Created: mm/dd/yyyy
   Modified: mm/dd/yyyy
/*
/*eof*/
```

The MSA directory contains an alert unit 64 configuration data file (LU.DAT). The following illustrates the format of LU.DAT:

```
/* LU.DAT
   CommonaLert Unit Configuration Data File
   Created: mm/dd/yyyy
   Modified: mm/dd/yyyy
*/
[num_pager_enabled] true/false      // numeric pager alerts
                                       enabled
[alphanum_pager_enabled] true/false // alphanumeric pager alerts
                                       enabled
[email_enabled] true/false          // e-mail alerts enabled
[email_server] xxx.xxxxxxxx.xxxx.xxx // e-mail server
[email_server_port]                 // e-mail server port
[fax_enabled] true/false            // fax alerts enabled
[voice_enabled] true/false          // voice alerts enabled
[escalation_enabled] true/false     // alert escalation enabled
[com_port] com2                     // modem com port for
                                       pager and fax
/*eof*/
```

The MSA directory contains a report unit 65 configuration data file (RU.DAT). The following illustrates the format of RU.DAT:

```
/* RU.DAT
   Common Report Unit Configuration Data File
   Created: mm/dd/yyyy
   Modified: mm/dd/yyyy
*/
```

```
[batch_dow] 1       // numeric for day of week that batch reports; run
                       1=Sunday, 7=Saturday
[batch_tod] 0100    // mil time for time to run batch reports
/*eof*/
```

The MSA directory contains an admin unit 62 configuration data file (AU.DAT). The following illustrates the format of AU.DAT:

```
/* AU.DAT
   Common Admin Unit Configuration Data File
   Created: mm/dd/yyyy
   Modified: mm/dd/yyyy
*/
[admin_passwd] @#$%%$^$       // password for admin level (encoded)
[remote_passwd]^ &#%^#@$%    // password for remote access (encoded)
/*eof*/
```

The MSA directory contains a customer unit 68 configuration data file (CIVU.DAT). The following illustrates the format of CIVU.DAT:

```
/* CIVU.DAT
   Common Customer Input/Viewer Unit Configuration Data File
   Created: mm/dd/yyyy
   Modified: mm/dd/yyyy
*/
[admin_passwd] @#$%%$^$       // password for CIVU admin level
                                  (encoded)
[remote_passwd] ^&#%^#@$%    // password for CIVU remote
                                  access (encoded)
/*eof*/
```

The MSA directory contains a data store 66 configuration data file (DS.DAT). The following illustrates the format of DS.DAT:

```
/* DS.DAT
   Common Data Store Configuration Data File
   Created: mm/dd/yyyy
   Modified: mm/dd/yyyy
*/
[ds_unc_loc] \\server\share    // unc name for data store area
/*eof*/
```

The OPERATIONS directory contains a several operations related data files. Following illustrates the format of some of those files:

```
/*    .\OPERATIONS0PERATIONS.DAT
      Operations<General Data File - One file per monitor set.
      This data is used for internal alerts; performance problems, etc.
      Created: mm/dd/yyyy
      Modified: mm/dd/yyyy
*/
[cust_company] Quicksand Development          // customer company name
[cust_contact] Miles Nixon                    // customer contact name
[cust_contact_pn] xxx.xxx.xxxx                // customer contact phone number
[access_login] aaaaaaa                        //customer login name
[access_passwd] @#$%%$^$                      // password for web server access
                                                  (encoded)
/*eof*/
/*    OPERATIONS.RESPONSE
      QSDev Configuration and Response Data File - One file per monitor set.
      This data is used for internal alerts; performance problems, etc.
      Created: mm/dd/yyyy
      Modified: mm/dd/yyyy
*/
[num_pager_pn] xxxxxxxxxx,xxxxxxxxxx          // numeric pager(s) phone number
[num_pager_pin] xxxxxxxxxx,xxxxxxxxxx         // numeric pager PIN(s)
[num_pager_email] aaaaa@xxxxx.com,aaaa@xxxxx.com
                                              // numeric pager email address(es)
[num_pager_msg] 64 911                        // numeric pager message
[alphanum_pager_pn] xxxxxxxxxx.xxxxxxxxxx     // alphanumeric pager(s) phone number
[alphanum_pager_pin]xxxxxxxxxx,xxxxxxxxxx     // alphanumeric pager PIN(s)
[alphanum_pager_email] aaaaa@xxxxx.com, aaaa@xxxxx.com
                                              // alphanumeric pager email address(es)
[alphanum_pager_msg] ws 911                   // alphanumeric pager message
[email_address] aaaaa@xxxxxxx.xxx, aaaaa@xxxxxxx.xxx
                                              // email address(es)
[email_msg] web server down                   // email additional message
[fax_pn] xxxxxxxxxx,xxxxxxxxxx                // fax phone number(s)
[fax_msg] web server down                     // fax additional message
[voice_email] aaaaa@xxxxx.com, aaaaa@xxxxx.com
                                              // voice email address(es)
[voice_pn] xxxxxxxxxx,xxxxxxxxxx              // voice phone number(es)
[voice_msg] web server down                   // voice additional message
[num_attempts] xx                             // number of attempts before escalation
                                              // zero indicates no escalation
[esc_num_pager_pn] xxxxxxxxxx,xxxxxxxxxx      // esc numeric pager phone number(s)
[esc_num_pager_pin] xxxxxxxxxx,xxxxxxxxxx     // esc numeric pager PIN(s)
[esc_num_pager_email] aaaaa@xxxxx.com, aaaaa@xxxxx.com
```

```
[esc_num_pager_msg] 64 911                              // esc numeric pager email address(es)
                                                        // esc numeric pager message
[esc_alphanum_pager_pn] xxxxxxxxxx, xxxxxxxxxx
                                                        // esc alphanumeric pager phone
                                                        // number(es)
[esc_alphanum_pager_pin] xxxxxxxxxx,xxxxxxxxxx
                                                        // esc_alphanumeric pager PIN(s)
[esc_alphanum_pager_email] aaaaa@xxxxx.com,aaaaa@xxxxx.com
                                                        // esc alphanumeric pager email address
[esc_alphanum_pager_msg] web server down                // esc alphanumeric pager message
[esc_email_address] aaaaa@xxxxxxx.xxx,aaaaa@xxxxxxx.xxx
                                                        // esc email address(es)
[esc_email_msg] web server down                         // esc email additional message
[esc_fax_pn] xxxxxxxxxx,xxxxxxxxxx                      // esc fax phone number(s)
[esc_fax_msg] web server down                           // esc fax additional message
[esc_voice_email] aaaaa@xxxxx.com,aaaaa@xxxxx.com
                                                        // esc voice email address(es)
[esc_voice_pn] xxxxxxxxxx,xxxxxxxxxx                    // esc voice phone number(es)
[esc_voice_msg] web server down                         // esc voice additional message
/*eof*/
```

Customer data files are preferably maintained separately from the general customer information or billing data. Each group of data files for each customer are kept in a separate subdirectory organized by using the customer ID number. The MSA directory contains customer master identification data, file (CUSTID.DAT). The following illustrates the format of CUSTID.DAT:

```
/* CUSTID.DAT
    Customer ID Data File
    Created: mm/dd/yyyy
    Modified: mm/dd/yyyy
*/
[cid_00000001] ABC Corp.        // Customer number 1
[cid_00000002] XYZ Corp.        // Customer number 2
/*eof*/
```

Located in each separate customer subdirectory are several configuration and data files unique to the corresponding customer. These files include the following:

```
/*   .\CID_0000000x\CUSTOMER.DAT
     Customer General Data File
     Created: mm/dd/yyyy
     Modified: mm/dd/yyyy
*/
[cust_company] aaaaaaaaaa          // customer company name
[cus_company] aaaaaaaaaa           // customer company name
[cust_contact] aaaaaaaaaaaaaa      // customer contact name
[cust_contact_pn] xxx.xxx.xxxx     // customer contact phone number
[access_login] aaaaaaa             // customer login name
[access_passwd] @#$%%$^$           // password for web server access (encoded)
[host] xxx.xxx.xxx.xxx             // customer host to monitor
[host] xxx.xxx.xxx.xxx             // customer 2nd host to monitor, etc.
/*   .\CID_0000000x\xxx.xxx.xxx.xxx.HOST
     Customer HOST Configuration Data File - One file per host
     Created: mm/dd/yyyy
     Modified: mm/dd/yyyy
*/
/*
     The first part is MONITORING data for this HOST
*/
[dns_name] xxx.xxxxxxxxxxxx.xxx    // take your pick
[mon_freq] 4                       // monitoring times per hour. 4 is the default
[rpt_freq] 1                       // report times per week. 1 is the default
[pingable] true/false              //
[ping_timeout] .xxx                // milliseconds
[web_host] www.xxxxxxx.com         // blank means no web page
[web_timeout] xxx                  // milliseconds or seconds
[web_pg_chksum] xxx                // checksum of web page
[web_pg_hack_data] "Case sensitive hack data"   // exactly what it says
[traceroute] true/false            // traceroute or not
[traceroute_hops] xx               // max count
/*
     The second part is RESPONSE data for this HOST
```

```
-continued

*/
[num_pager_pn] xxxxxxxxxx,xxxxxxxxxx      // numeric pager phone number(s)
[num_pager_pin] xxxxxxxxxx,xxxxxxxxxx     // numeric pager PIN(s)
[num_pager_email] aaaaa@xxxxx.com,aaaaa@xxxxx.com
                                          // numeric pager email address(s)
[num_pager_msg] 64 911                    // numeric pager message
[alphanum_pager_pn] xxxxxxxxxx,xxxxxxxxxx // alphanumeric pager phone number(s)
[alphanum_pager_pin] xxxxxxxxxx,xxxxxxxxxx // alphanumeric pager PIN(s)
[alphanum_pager_email] aaaaa@xxxxx.com,aaaaa@xxxxx.com
                                          // alphanumeric pager email address(es)
[alphanum_pager_msg] ws 911               // alphanumeric pager message
[email_address] aaaaa@xxxxxxx.xxxcaaaaa@xxxxxxx.xxx
                                          // email address(es)
[email_msg] web server down               // email additional message
[fax_pn] xxxxxxxxxx,xxxxxxxxxx            // fax phone number(s)
[fax_msg] web server down                 // fax additional message
[voice_email] aaaaa@xxxxx.com,aaaaa@xxxxx.com
                                          // voice email address(es)
[voice_pn) xxxxxxxxxx                     // voice phone number
[voice_msg] web server down               // voice additional message
[num_attempts] xx                         // number of attempts before escalation
                                          // zero indicates no escalation
[esc_num_pager_pn] xxxxxxxxxx,xxxxxxxxxx  // esc numeric pager phone number(s)
[esc_num_pager_pin] xxxxxxxxxx,xxxxxxxxxx // esc numeric pager PIN(s)
[esc_num_pager_email] aaaaa@xxxxx.com,aaaaa@xxxxx.com
                                          // esc numeric pager email address(es)
[esc_num_pager_msg] 64 911                // esc numeric pager message
[esc_alphanum_page_pn] xxxxxxxxxx,xxxxxxxxxx
                                          // esc alphanumeric pager phone number(s)
[esc_alphanum_pager_pin] xxxxxxxxxx,xxxxxxxxxx
                                          // esc alphanumeric pager PIN(s)
[esc_alphanum_pager_email] aaaaa@xxxxx.com,aaaaa@xxxxx.com
                                          // esc alphanumeric pager email address
[esc_alphanum_pager_msg] web server down  // esc alphanumeric pager message
[esc_email_address] aaaaa@xxxxxxx.xxx,aaaaa@xxxxxxx.xxx
                                          // esc email address(es)
[esc_email_msg] web server down           // esc email additional message
[esc_fax_pn] xxxxxxxxxx,xxxxxxxxxx        // esc fax phone number(s)
[esc_fax_msg] web server down             // esc fax additional message
[esc_voice_email] aaaaa@xxxxx.com,aaaaa@xxxxx.com
                                          // esc voice email address(es)
[esc_voice_pn] xxxxxxxxxx,xxxxxxxxxx      // esc voice phone number(s)
[esc_voice_msg] web server down           // esc voice additional message
/*eof*/
/*      .\CID_0000000x\xxx.xxx.xxx.xxx.ABYPASS
        Customer HOST Alert Bypass File
        This file contains no data.
        Its existence indicates that alerts for this host are temporarily being bypassed.
*/
/*      .\CID_0000000x\xxx.xxx.xxx.xxx.MDATA
        Customer HOST Monitor Results Data File - One file per host
*/
/*
        This data is recorded by the control unit 60.
        Most of it is also passed to the alarm unit 64 for alarm processing.
*/
*/      Monitor data is comma delimited. There is one line (entry) per scan attempt.
        Data is as follows:
        yyyymmdd            - year, month, day of scan.
        hhmmss.x            - hour, minute, second, and tenth of second of scan.
        111                 - number of pings sent. Zero indicates host was non-pingable.
        222,333,444         - resultant millisecond times of the pings.
ss.x                        - seconds and tenth of second to return web page. Empty field indicates
                              unsuccessful attempt to obtain web page.
chksum                      - checksum of retrieved page (hex).
h-y/n                       - y/n did hack text check out
a-y/n                       y/n was an alert sent
trcrtdata                   - trace route data string.
*/
yyyymmdd,hhmmss.x, 111,222,333,ss.x,cksum,h-y/n,a-y/n,trcrtdata
/*      .\CID_0000000x\xxx.xxx.xxx.xxx.ALERT
        Customer HOST ALERT Record Data File - One file per host
*/
/*
        This data is recorded by the alert unit 64..
*/
/*      Alert data is comma delimited. There is one line entry per alert.
        Data is as follows:
        yyyymmdd            - year, month, day of alert. (To point back to monitor data file.)
```

-continued

| | |
|---|---|
| hhmmss.x | - hour, minute, second, and tenth of second of alert. |
| yyyymmdd | - year, month, day that alert was processed. |
| hhmmss.x | - hour, minute, second, and tenth of second that alert was processed. |
| atype | - alert type:<br>    1 - no ping response<br>    2 - web page not returned<br>    3 - web page chksum bad<br>    4 - web page hack alert |
| alevel | - alert level:<br>    0 - alert bypass enabled, no alert sent<br>    1 - normal<br>    2 - escalated |
| ameth | - alert method used:<br>    1 - numeric page<br>    2 - alphanumeric page<br>    3 - e-mail<br>    4 - fax<br>    5 - voice |
| adata | - alert data - e-mail address or phone number used |

*/
yyyymmdd, hhmmss.x, yyyymmdd, hhmmss.x,atype,alevel,ameth,adata

Figure 4:
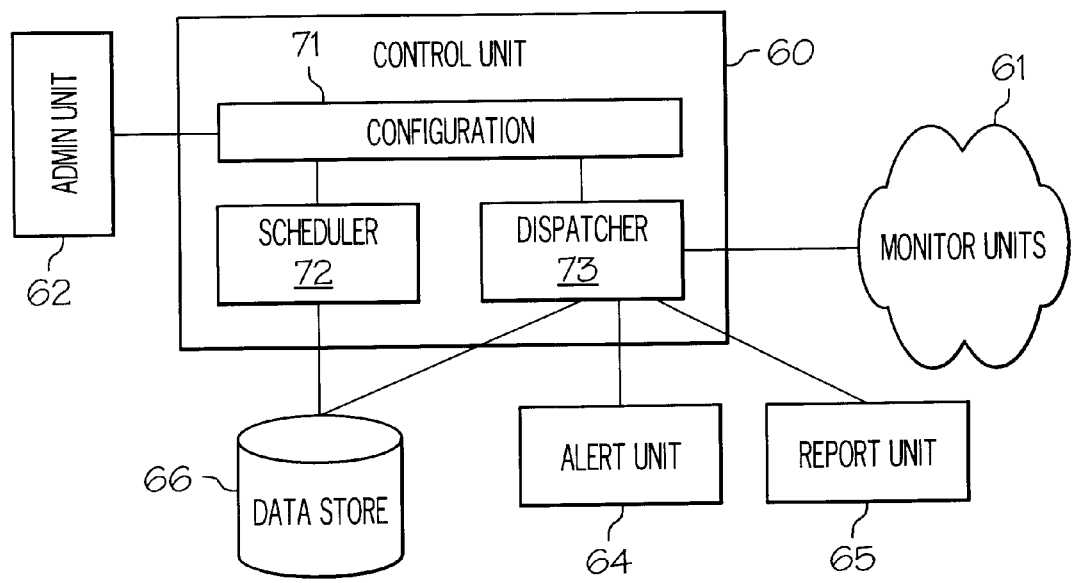
FIG. 4 illustrates the components of a control unit.

FIG. 4 depicts an example of a control unit 60 and some of its components. The Configuration object 71 administers the control unit 60. The Configuration object 71 communicates with the admin unit 62, which is preferably running on the same machine as the control unit 60. However, the admin unit 62 can be run remotely. The Scheduler object 72 builds a schedule of work to do based on data retrieved from on the data store 66. The Scheduler object 72 maintains the job list and triggers the start of those jobs. The Dispatcher object 73 maintains communications with the monitor units 61. When a job needs to be done, the Scheduler object 72 sends the job information to the Dispatcher object 73. The Dispatcher object 73 maintains a queue of new jobs and communicates the jobs to the monitor units 61. The Dispatcher object 73 also maintains a list of active monitor units 61 and their status.

The Scheduler object 72 reads in all jobs and sets up a schedule in an internal data structure. The Scheduler object 72 is flexible enough that job information can be added and deleted dynamically. The Scheduler object 72 watches the system clock and sends appropriate jobs to the Dispatcher object 73. The Scheduler object 72 also staggers jobs. For instance, if the system is monitoring 2000 informational resources hourly, it is preferred that 2000 tasks are distributed over the hour instead of lumping the jobs all at once. When a new informational resource is added, the Scheduler object 72 determines the best spot to put it in the schedule.

The Dispatcher object 73 maintains a connection with each monitor unit 61. When a monitor unit 61 connects to the server, a new TCP/IP port is assigned to that connection. All communication passes on this port. In some implementations it may be necessary to use more than one port for each monitor unit 61. The Dispatcher object 73 manages all available monitor units 61. If a job is completed successfully by a monitor unit 61, the results are stored in the data store 66. If a job fails or the results indicate a critical condition, the data is stored and a message is sent to the alert unit 64. The Dispatcher object 73 also communicates with the report unit 65 with instructions to publish reports.

Figure 5:
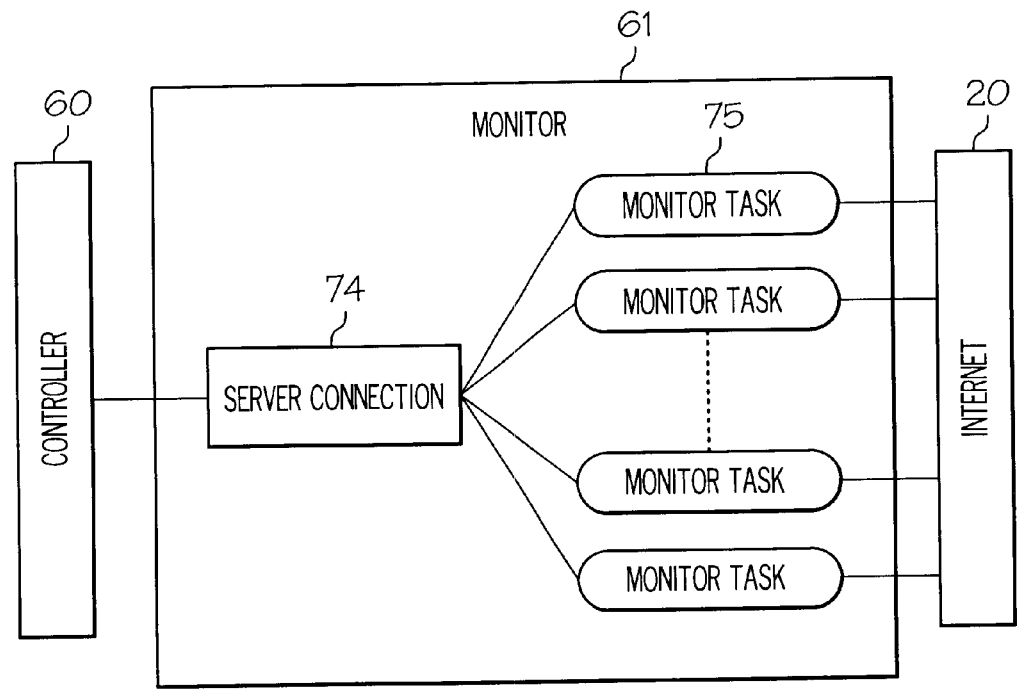
FIG. 5 illustrates the components of a monitor unit.

FIG. 5 illustrates an example of a monitor unit 61 and some of its components. The ServerConnection object 74 maintains a connection to the control unit 60 for instruction. When an instruction is received it creates a MonitorTask object 75 that processes that instruction. All communication between the monitor unit 61 and control unit 60 takes place through a TCP/IP network. The monitor unit 61 is multi-threaded, so many different tasks can execute concurrently. Each MonitorTask object 75 executes in its own thread, performing its task and sending results through the ServerConnection object 74.

When the monitor unit 61 is loaded, it first establishes a connection with the control unit 60. For configurations where multiple control units 60 exist in one monitoring system, the monitor unit 61 is configured with the IP address or DNS name of the corresponding control unit 60.

The ServerConnection object 74 object polls a TCP/IP port waiting for messages. When a message is received, an appropriate MonitorTask object 75 object is created and initialized with the data necessary to complete that task. Preferably, the MonitorTask objects 75 are instantiated from a MonitorTask class containing the common data and functionality needed by all tasks and then subclass MonitorTask object 75 for each separate task, such as MonitorTaskPing, MonitorTaskTraceRoute, MonitorTaskURLCheck, MonitorTaskGetURL, and the like, thus taking advantage of object oriented programming in languages such as Java, C++, ActiveX, and the like.

MonitorTask objects 75 exist for all communications that travel over the Internet 20, including but not limited to pinging a host, performing a trace route to a host, checking the web server of a host for a reply, retrieving a document from a web server, retrieving information from a client program running on the host, sending a command to the web host to execute a program, and the like. When the Monitor-Task object 75 has finished, it gives the results to Server-Connection object 74, which sends the results to the control unit 60 for further processing.

As indicated above, the monitoring system preferably uses the standard TCP/IP protocol and tools to perform both its monitoring and to communicate between the distributed computers. Encapsulated within the TCP/IP data packet is a data language used to efficiently communicate between the computers participating in the system. Preferably, the packets are configured using the RMI ("Remote Method Interface") feature built into Java.

By way of illustration, the following text provide example dialogs between the monitor unit 61 (MU) and the control unit 60 (CU) during monitor. The term "PCID" is a short hand notation for Protocol Command Identifier. The characters ">" and "<" are used to indicate that a message is being transferred.

Dialog of MU Boot Up

| MU | CU | PCID |
|---|---|---|
| (MU boots up, reads CU ip number, reads its common config data, reads its unique config data [if exists].) | | |
| ATT, CU! Registration request. My IP# is xxx.xxx.xxx.xxx. | > | 203 |
| | < AGK! MUxxx.xxx.xxx.xxx, you're registered. | 103 |
| ACK CU! Confirming. | > | 201 |

MU reads the CU IP number from the UNITIP.DAT file when it boots up. It then reads its configuration data files from the file server. CU keeps track of how many hosts the MU is currently monitoring and feeds it with more after the MU returns host data.

For the rest of the examples, it is assumed that the MU and CU are already running and configured to communicate with each other.

Dialog with Successful Monitor

| MU | CU | PCID |
|---|---|---|
| | < ATT MU! Monitor data: ping, web, hops, host name or ip, etc. | 104 |
| ACK! Confirming. (MU does its thing . . . ) | > | 201 |
| ATT, CU! I'm done and host is OK. Monitor data: ping time, web time, host name or ip | > | 204 |
| | < ACK! Confirming | 101 |

It is preferred to specify the CU for the MU to request data from rather than using broadcasts. That way, they can be grouped together by Monitor Sets. After the MU is registered with the CU, the CU controls and keeps track of what hosts the MU is currently handling. The MU and CU preferably confirm that the operation is complete. Otherwise, retry. The MU has enough logic to handle all of the monitoring logic. This dialog takes place with the MU's ServerConnecton object for all monitor tasks.

Dialog with Unsuccessful Monitor

| MU | CU | PCID |
|---|---|---|
| | < ATT MU! Monitor data: ping, web, hops, host name or ip, etc. | 104 |
| ACK! Confirming (MU does its thing. . .) | > | 201 |
| ATT, CU! I'm done and host is BROKEN. Monitor data: ping time, web time, host name or ip | > | 205 |
| | < ACK! Confirming (CU sends alert to LU) | 101 113 |

If a host is broken, it is preferably monitored continuously on an accelerated schedule until; 1) the host comes back online or 2) the CU is told to pause or stop monitoring of the broken host. The CU is responsible to handle the accelerated and continuous monitoring of a broken host and tell the MU how and when to do that.

CU_MU Timeout Dialog

| CU | MU | PCID |
|---|---|---|
| ATT, MU! Request Status. | > | 107 |
| | (No response.) | |
| (Timeout period expires. CU will then try again as many times as defined in the master configuration file.) | | |
| ATT, MU! Request Status. ($2^{nd}$ try) | > | 107 |
| | (No response.) | |
| (Timeout period expires again. CU will then try again as many times as defined in the master configuration file.) | | |
| ATT, MU! Request Status. ($n^{th}$ try) | > | 107 |
| | (No response.) | |
| (Timeout period expires again. CU will now try to get the MU to reset itself.) | | |
| ATT, MU! Request Restart | > | 108 |
| | (No response.) | |
| (CU now waits for a certain period of time for the MU to reset itself and send a registration request.) | | |
| | (No response.) | |
| (CU determines that the MU is nonfunctional. CU now sends an alert to the aLert Unit for processing.) | | 114 |

The number of times to retry getting status should be defined in a master configuration file. The actual action taken after the MU fails to respond n amount of times may be defined in the configuration file also.

By way of illustration, the following text provide an example communications protocol, based on the above examples of conversations between the MU and the CU. Construction of the packets will be at the field level in Java. The term "MSID" is a shorthand notation for Message Sequence Identifier.

PCID Number (all) 0xx series numbers (applies to all units)

CU: 1xx series numbers

MU: 2xx series numbers

LU: 3xx series numbers

RU: 4xx series numbers

AU: 5xx series numbers

DS: 6xx series numbers

Within all communications between Units on the LAN will use IP numbers. Within all communications by MUs on the Internet, either the IP or the DNS name can be used.

ALL UNITS (0xx)

ATT! SERIOUS Error. A serious error occurred somewhere (e.g. self-destruct initiated, etc.).

PCID: 000

Field 1: integer—PCID

Field 2: string—IP of originator

CU (1xx)

ATT! CU Error. Some kind of error occurred.

PCID: 100

Field 1: integer—PCID

Field 2: string—IP of originator

ACK MU! Message/Command Acknowledgment.
  PCID: 101
  Field 1: integer—PCID
  Field 2: integer—MSID
NAK MU! Message/Command Negative Acknowledgment.
  PCID: 102
  Field 1: integer—PCID
  Field 2: integer—MSID
ATT MU! Registration confirmed.
  PCID: 103
  Field 1: integer—PCID
  Field 2: integer—MSID
ATT MU! Monitor this host.

```
PCID:104
Field 1: integer-PCID
Field 2: integer-MSID
Field 3: integer-Pingable host-  Zero = non-pingable
                                 Non-zero = pingable, value is
                                 timeout
Field 4: integer-Web host-       Zero = not a web host
                                 Non-zero = Web host, value is
                                 web page timeout
Field 5: integer-Traceroute-     Zero = do not traceroute
                                 Non-zero = traceroute, value
                                 is number of hops
Field 6: string-IP or DNS name of host (variable length data)
Field 7: string-URL of web page to obtain (variable length data)
```

ACK MU! Host monitor complete and host is OK. Confirming.
  PCID: 105
  Field 1: integer—PCID
  Field 2: integer—MSID
ACK MU! Host monitor complete and the host was BROKEN. Confirming.
  PCID: 106
  Field 1: integer—PCID
  Field 2: integer—MSID
ATT MU! Request Status.
  PCID: 107
  Field 1: integer—PCID
  Field 2: integer—MSID
ATT MU! Restart (restart software.)
  PCID: 108
  Field 1: integer—PCID
  Field 2: integer—MSID
ATT MU! Reboot (reboot hardware.)
  PCOD: 109
  Field 1: integer—PCID
  Field 2: integer—MSID
ATT MU! Pause monitoring.
  PCID: 110
  Field 1: integer—PCID
  Field 2: integer—MSID
ATT MU! Resume monitoring.
  PCID: 111
  Field 1: integer—PCID
  Field 2: integer—MSID
ACK MU! Standby (response to MU idle inquiry if CU is not ready to send another host)

PCID: 112
  Field 1: integer—PCID
  Field 2: integer—MSID
ATT LU! We have a BROKEN host. Handle it.

```
PCID: 113
Field 1: integer-PCID
Field 2: integer-MSID
Field 3: integer-Ping time-    Zero = host timed out on ping
                               Non-zero = ping time for host
Field 4: integer-Web time-     Zero = host timed out on web
                               page retrieval
                               Non-zero web = page retrieval
                               time
Field 5: boolean-Check Sum Failed Alert
Field 6: boolean-Hack String Failed Alert
Field 7: string-Customer ID
Field 8: string-IP or DNS name of broken host (variable length data)
Field 9: string-Traceroute information (variable length data)
```

ATT LU! We have a BROKEN MU. Alert the boss.
  PCID: 114
  Field 1: integer—PCID
  Field 2: integer—MSID
  Field 3: string—IP of broken MU
ATT LU! Incomplete host data. Alert the boss.
  PCID: 115
  Field 1: integer—PCID
  Field 2: integer—MSID
  Field 3: string—Customer ID
  Field 4: string—IP or DNS name of incomplete host (variable length data)
ATT MU! Change your configuration. New parameters follow.
  PCID: 116
  Field 1: integer—PCID
  Field 2: integer—MSID
  Field 3: string—MU Configuration Data File contents (variable length data)
ATT LU! System performance WARNING. Performance threshold exceeded. Alert the boss.
  PCID: 117
  Field 1: integer—PCID
  Field 2: integer—MSID
  Field 3: string—IP or DNS name of CU with the performance warning
  Field 4: string—queue that exceeded performance threshold
ATT LU! System performance PROBLEM. Performance limits exceeded. Alert the boss.
  PCID: 118
  Field 1: integer—PCID
  Field 2: integer—MSID
  Field 3: string—IP or DNS name of Cu with the performance problem
  Field 4: string—queue that exceeded performance limits
ATT LU! BROKEN host is back online. Cancel alerts.
  PCID: 119
  Field 1: integer—PCID
  Field 2: integer—MSID
  Field 3: string—Customer ID
  Field 4: string—IP or DNS name of broken host (variable length data)

MU (2xx)
ATT! MU Error. Some kind of error occurred.
  PCID: 200
  Field 1: integer—PCID
  Field 2: string—IP of originator
ACK! Message/Command Acknowledgement.
  PCID: 201
  Field 1: integer—PCID
  Field 2: integer—MSID
NAK! Message/Command Negative Acknowledgement.
  PCID: 202
  Field 1: integer—PCID
  Field 2: integer—MSID
ATT CU! Registration Request.
  PCID: 203
  Field 1: integer—PCID
  Field 2: string—IP of originator.
    (No MSID at this point, this should be the only message outstanding for this MU.)
ATT CU! Host monitor complete and host is OK.
  PCID: 204
  Field 1: integer—PCID
  Field 2: integer—MSID
  Field 3: integer—Ping time
  Field 4: integer—Web time
ATT CU! Host monitor complete and the host is BROKEN.

---

PCID: 205
Field 1: integer-PCID
Field 2: integer-MSID
Field 3: integer-Ping time-    Zero = host timed out on ping
                               Non-zero = ping time for host
Field 4: integer-Web time-     Zero = host timed out on web
                               page retrieval
                               Non-zero = web page retrieval
                               time
Field 5: string-IP or DNS name of broken host (variable length data)
Field 6: string-Traceroute information (variable length data)

---

ATT CU! Error! I already am at my maximum simultaneous host limit! What are you THINKING?
  PCID: 206
  Field 1: integer—PCID
  Field 2: string—IP of originator
ATT CU! I'm idle and you haven't responded in x amount of time. Request response.
  PCID: 207
  Field 1: integer—PCID
  Field 2: string—IP of originator
LU (3xx)
ATT! LU Error. Some kind of error occurred.
  PCID: 300
  Field 1: integer—PCID
  Field 2: string—IP of originator
ACK! Message/Command Acknowledgment.
  PCID: 101
  Field 1: integer—PCID
  Field 2: integer—MSID
NAK! Message/Command Negative Acknowledgment.
  PCID: 102
  Field 1: integer—PCID
  Field 2: integer—MSID
ACK CU! Confirming broken host.
  PCID: 301
  Field 1: integer—PCID
  Field 2: integer—MSID
RU (4xx)
ATT! RU Error. Some kind of error occurred.
  PCID: 400
  Field 1: integer—PCID
  Field 2: string—IP of originator
ACK! Message/Command Acknowledgment.
  PCID: 401
  Field 1: integer—PCID
  Field 2: integer—MSID
NAK! Message/Command Negative Acknowledgment.
  PCID: 402
  Field 1: integer—PCID
  Field 2: integer—MSID
AU (5xx)
ATT! AU Error. Some kind of error occurred.
  PCID: 500
  Field 1: integer—PCID
  Field 2: string—IP of originator
ACK! Message/Command Acknowledgment.
  PCID: 501
  Field 1: integer—PCID
  Field 2: integer—MSID
NAK! Message/Command Negative Acknowledgment.
  PCID: 502
  Field 1: integer—PCID
  Field 2: integer—MSID.
DS (6xx)
ATT! DS Error. Some kind of error occurred.
  PCID: 600
  Field 1: integer—PCID
  Field 2: string—IP of originator
ACK! Message/Command Acknowledgment.
  PCID: 601
  Field 1: integer—PCID
  Field 2: integer—MSID
NAK! Message/Command Negative Acknowledgment.
  PCID: 602
  Field 1: integer—PCID
  Field 2: integer—MSID In one embodiment of the invention, a monitoring system is implemented as a distributed client-server system of Java processes communicating over TCP/IP. The monitoring workload is spread over multiple machines and controlled by one or more servers. Each client machine monitors its assigned hosts and report the results to the server for processing. The server maintains a balanced workload over all the clients and logs the success or failure of the host monitoring. The server also triggers host downtime alerts and notifies operators of any potential problems within the system. The system is scalable as well as "plug and play". Any client started will register itself with the server and wait for work to be assigned. The server can control any number of clients. Adding another machine will expand the processing capacity of the monitoring system. Since the entire system operates by TCP/IP networking, performing remote administration of the server over TCP/IP is possible. Those administration changes are instantly transferred to each client.

Because the server performs all disk I/O, the clients will not necessarily, need access to the data store. Having a centralized point of administration and reporting will help minimize the number of problems that might exist when multiple machines and processes are generating data. Responsiveness will be increased as changes can be instantly transferred to the clients. The system is highly scalable because of the automated nature of the server load balancing. Any new client will instantly be assigned work. Any failed client's work can be assigned to operational clients. Because all communication between the client and server travels over TCP/IP, clients can be located anywhere with an accessible TCP/IP address. Clients all over the world can be controlled by a single, or multiple, servers. Using Java provides instant networking capabilities and gives the added benefit of cross-platform deployment. Any machine with enough memory and disk space to run an operating system with a supported Java Virtual Machine can be used as a client.

When started, the server initializes and reads in the current configuration. The list of hosts to be monitored is also loaded. Then the server checks the network for available clients. Once the server has registered clients it begins to give them work. All scheduling and load balancing takes place on the server. In one embodiment where multiple servers are used, each server can be controlled by a master server. In such an embodiment, the host list will be divided to the servers by the master server and all scheduling and client control takes place at the original servers.

Clients are assigned a host list to monitor by the server. Alternatively, clients are assigned each monitoring task dynamically. One advantage of assigning a host list is that interactive network traffic is reduce and latency between monitoring tasks is also reducing. However, a single host task may be more reliable. If the client fails only one task has been interrupted. In an intermediate embodiment, small host lists are assigned to each client. The clients, after completing a monitoring task, report the results to the server.

What is claimed:

1. A method for monitoring a website being supported by a web server, comprising the steps of:
   a) determining whether the web server is pingable;
   b) if the web server is pingable, performing a ping operation comprising the steps of:
      (i) sending a ping to the web server;
      (ii) determining whether the web server responds to the ping;
      (iii) if the web server does not respond to the ping, sending a message;
   c) attempting to access the website by requesting the primary web page from the web server; and
   d) if the website is not accessible, sending a message.

2. A method as recited in claim 1, further comprising the step of sending a message if the web server does not return the primary web page within a predetermined period of time.

3. A method as recited in claim 1, further comprising the step of recording the time for the web server to return the primary web page.

4. A method as recited in claim 1, wherein the steps of sending a message comprises sending an alert via pager, electronic mail, facsimile transmission or vocal telephone transmission.

5. A method as recited in claim 1, further comprising the step of determining the performance of the website if it is accessible.

6. A method as recited in claim 5, further comprising the step of providing a report comprising the ping response time and at least a portion of the determined performance.

7. A computer readable medium, comprising instructions capable of performing the method of claim 1.

* * * * *